United States Patent [19]

Clamp

[11] Patent Number: 5,000,688

[45] Date of Patent: Mar. 19, 1991

[54] MAGNETIC STENCIL LETTERS

[76] Inventor: Esther L. Clamp, Rte. 1, Box 12,, Salley, S.C. 29137

[21] Appl. No.: 397,343

[22] Filed: Aug. 22, 1989

Related U.S. Application Data

[63] Continuation of Ser. No. 135,561, Dec. 22, 1987, abandoned, which is a continuation of Ser. No. 567,922, Jan. 3, 1984, abandoned.

[51] Int. Cl.$^5$ ...................... G09B 11/04; B43L 13/00
[52] U.S. Cl. ..................................... 434/164; 33/564; 33/DIG. 1; 101/127
[58] Field of Search ............... 101/128.21, 128.4, 127, 101/127.1; 434/87, 164; 33/564, 565, DIG. 1

[56] References Cited

U.S. PATENT DOCUMENTS

| | | | |
|---|---|---|---|
| 839,187 | 12/1906 | Norton | 101/129.21 X |
| 929,961 | 8/1909 | Luke | 33/564 |
| 1,325,194 | 12/1919 | Geist | 101/128.4 X |
| 1,600,229 | 9/1926 | Heidman | 101/127 X |
| 1,633,703 | 6/1927 | Kaji | 33/564 |
| 1,809,199 | 6/1931 | Gould | 101/127 |
| 2,500,617 | 3/1950 | Meigs | 101/127 X |
| 3,247,573 | 4/1966 | Noack | 101/127 X |

FOREIGN PATENT DOCUMENTS 253931 1/1927 United Kingdom ............ 101/127.1

Primary Examiner—Edgar S. Burr
Assistant Examiner—Moshe I. Cohen

[57] ABSTRACT

These magnetic stencil letters enable a small child to learn to write his name, etc. quickly. Primarily, the letters are packaged as a set, and are magnetic, so as to adhere to a steel panel on top of a piece of paper, which is to be stenciled with letters forming the child's name and words.

1 Claim, 1 Drawing Sheet

MAGNETIC STENCIL LETTERS

This application is a continuation of application Ser. No. 07/135,561, filed Dec. 22, 1987, now abandoned, which is a continuation of Ser. No. 567,922, filed Jan. 3, 1984, now abandoned.

This invention relates to teaching aids, and more particularly, to magnetic stencil letters.

The principal object of this invention is to provide magnetic stencil letters, which will be unique and novel, in that they will serve to enable a child to write quickly and easily.

Another object of this invention is to provide magnetic stencil letters, which will consist of all of the letters of the alphabet, and will be placed individually on a piece of paper, laid on a ferrous metal or magnetic panel, so as to enable a child to employ a pencil to duplicate each letter.

Another object of this invention is to provide magnetic stencil letters, which will be of such design, as to serve as templates for penciling letters on paper accurately.

A further object of this invention is to provide magnetic stencil letters, which will be so designed, as to hold a child's attention, and motivate a child to want to learn to write.

Other objects are to provide magnetic stencil letters which are simple in design, inexpensive to manufacture, rugged in construction, easy to use, and efficient in operation.

These, and other objects, will be readily evident, upon a study of the following specification, and the accompanying drawing, wherein.

Figure 1:
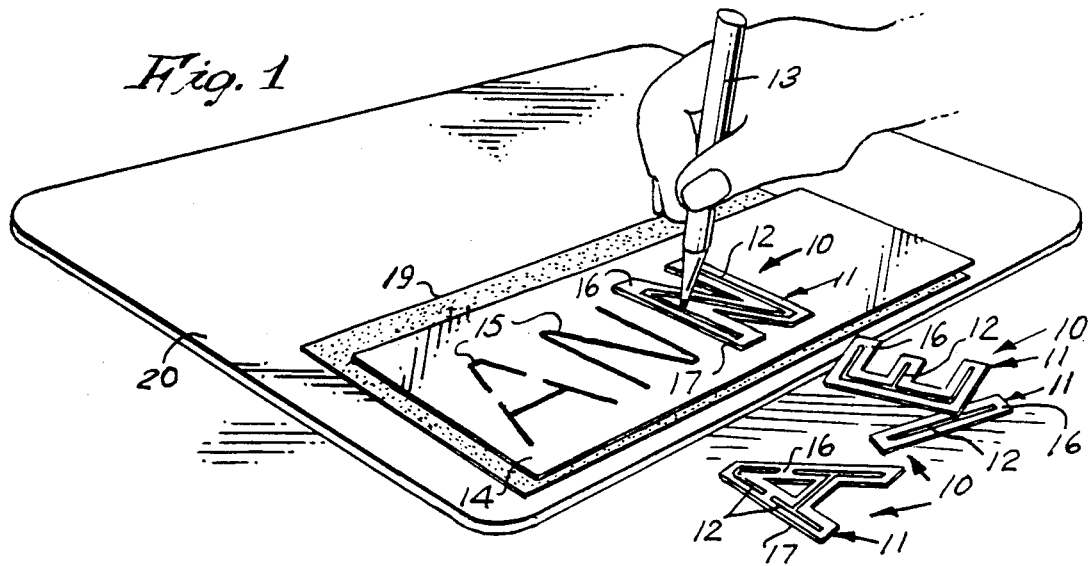
FIG. 1 is a perspective view of the present invention, shown in operative use.
Figures 2, 3, 4:
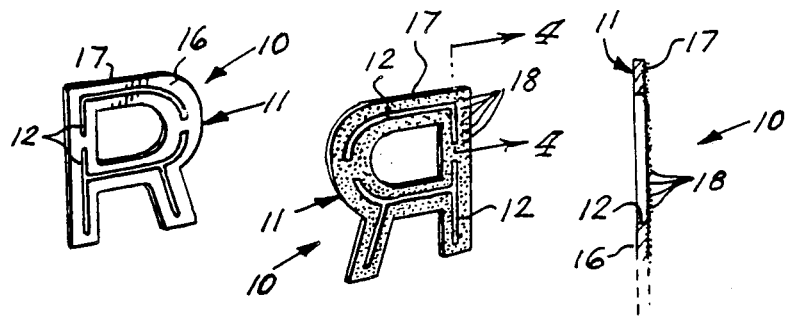
FIG. 2 is a front perspective view of another of the letter characters of the invention.
FIG. 3 is a rear perspective view of FIG. 2.
FIG. 4 is an enlarged cross-sectional view, taken along the line 4—4 of FIG. 3.

Accordingly, a plurality of letter character-shaped pieces 10 are shown to include a flat body 11, having geometrically centered grooves 12 therethrough, which form template means for receiving a scribing instrument, such as a pencil 13, so as to stencil the alphabetical form of the body 11 on a sheet of paper 14, as is illustrated in FIG. 1 by the letter formed lines 15. The front surface 16 of body 11 is bare, and the rear surface 17 is provided with a plurality of magnetic particles 18, which are suitably adhered thereto. The magnetic particles 18 of the body 11 enable the body 11 to adhere magnetically to the steel panel 19 on a board 20, through the paper 14 thereon, by magnetic force, and the body 11 will remain stationary against the paper 14, so as to enable the child to place the pencil or other scribing device in the grooves 12, and stencil the letter represented by the particular letter character-shaped piece 10. For attractiveness, the panel 19 may be of any desired color, and the pieces 10 may also be of different colors and of various suitable materials.

It shall be noted, that the body 11 is not limited to magnetic particles 18 being adhered thereto, the particles 18 of the body 11 may also be impregnated therein, when body 11 is so designed, that a child can easily reproduce a letter by the pencil 13 being placed in the grooves 12, because small children do not have the ability to trace around objects.

It shall also be noted, that children's names, in the form of pieces 10, may be separately packaged, and the faces thereof may include unique designs, so as to be different from a complete set of the alphabet in a set, which may further include numerical characters as well.

In use, panel 19 is, first, placed upon board 20, or other suitable surface, and a sheet of paper 14 is then placed on top of panel 19. The pieces 10 are then placed on top of paper 14, where they will be retained by the magnetic force of the particles 18, which are attracted to the panel 20 through the paper 14. The child then holds the pencil 13 with its point in the grooves 12, and proceeds to guide the pencil therein, and produce the letter formed lines 15. When finished, the pieces 10 are then slid off of the paper 14, thus enabling the paper 14 to be removed from the panel 19.

Figure 5:
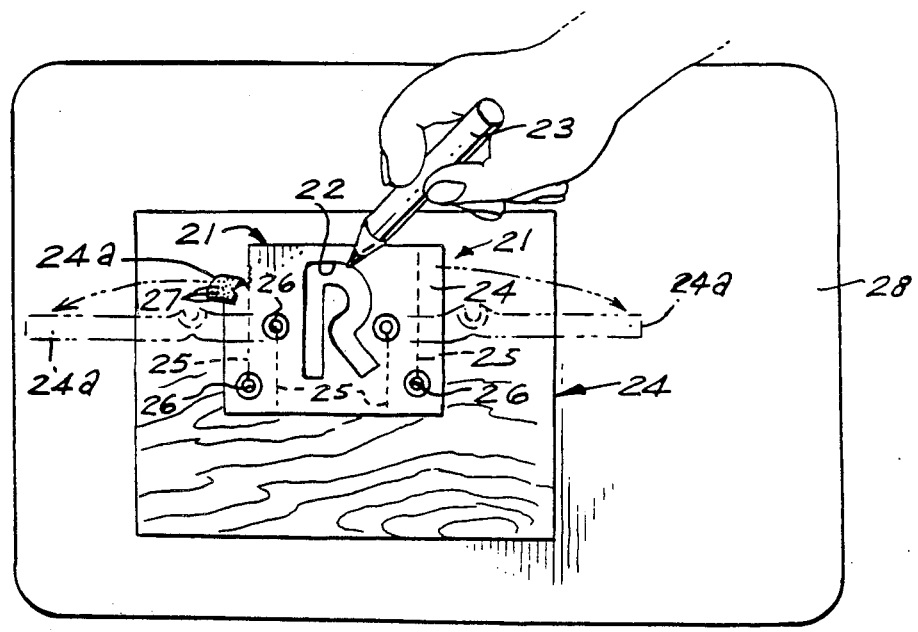
FIG. 5 is a front elevational view of a modified form of the invention, showing the pull-out tabs in phantom, in their extended condition.

Referring now to FIG. 5, a modified piece 21 consists of a rectangular flat body 21, having a cut-out 22 in the shape of a letter character, therethrough, for the placement of pencil 23, to reproduce the letter character design on a thick block of wood 24. Piece 21 includes a pull-tab 24a on each side, which is defined by perforation lines 25, which enables tabs 24a to be control separated to the openings 26 through piece 21. The openings 26 serve to prevent full separation of tabs 24a from piece 21, and the bottom surfaces of pull-tabs 24a are coated with magnetic particles 27, in the same manner as was heretofore described of pieces 10, so as to adhere to the steel panel 28, upon which the block of wood 24 is placed. Two perforation lines 25 are provided on each side of piece 21, and are terminated at one end by openings 26, so as to provide a longer extension of pull-tabs 24a, when needed to hold down a block of wood 24 of greater thickness.

In use, the steel panel 28 is placed upon a desired flat surface, and the block of wood 24 is placed thereon. The pull-tabs 24a are then grasped and separated along the perforation lines 25. When separated, they are then pulled outwards, and with the magnetic particle 27 side down, they are placed against the panel 28, where, by magnetic flux force, they will render the wood stationary on panel 28. The child then grasps the pencil 23, and, by its point in the opening 22, stencils the shape of the letter character onto the surface of the block of wood 24.

While various changes may be made in the detail construction, it is understood that such changes will be within the spirit and scope of the present invention, as is defined by the appended claims.

What I claim is:

1. A letter stenciling set for use by a child as an aid in learning to write comprising, a platen constructed of magnetic material, a sheet of paper received on said platen, a plurality of letter character-shaped pieces with intermediate grooves therethrough for receiving a scribing instrument, each letter character-shaped piece having a border corresponding to an individual single letter extending entirely thereabout, each letter character-shaped piece being independently placeable upon and independently removable from said platen, being constructed of magnetic material exerting an attractive magnetic force removably receivable on said platen such that the letter of each letter character-shaped piece may be drawn by pulling the scribing instrument within the geometrically shaped grooves along the length thereby or by tracing entirely about the outer edges of the letter character-shaped piece.

* * * * *